A. A. BACKHAUS.
APPARATUS FOR THE PRODUCTION OF ALDEHYDES.
APPLICATION FILED DEC. 19, 1918.
1,437,483.
Patented Dec. 5, 1922.
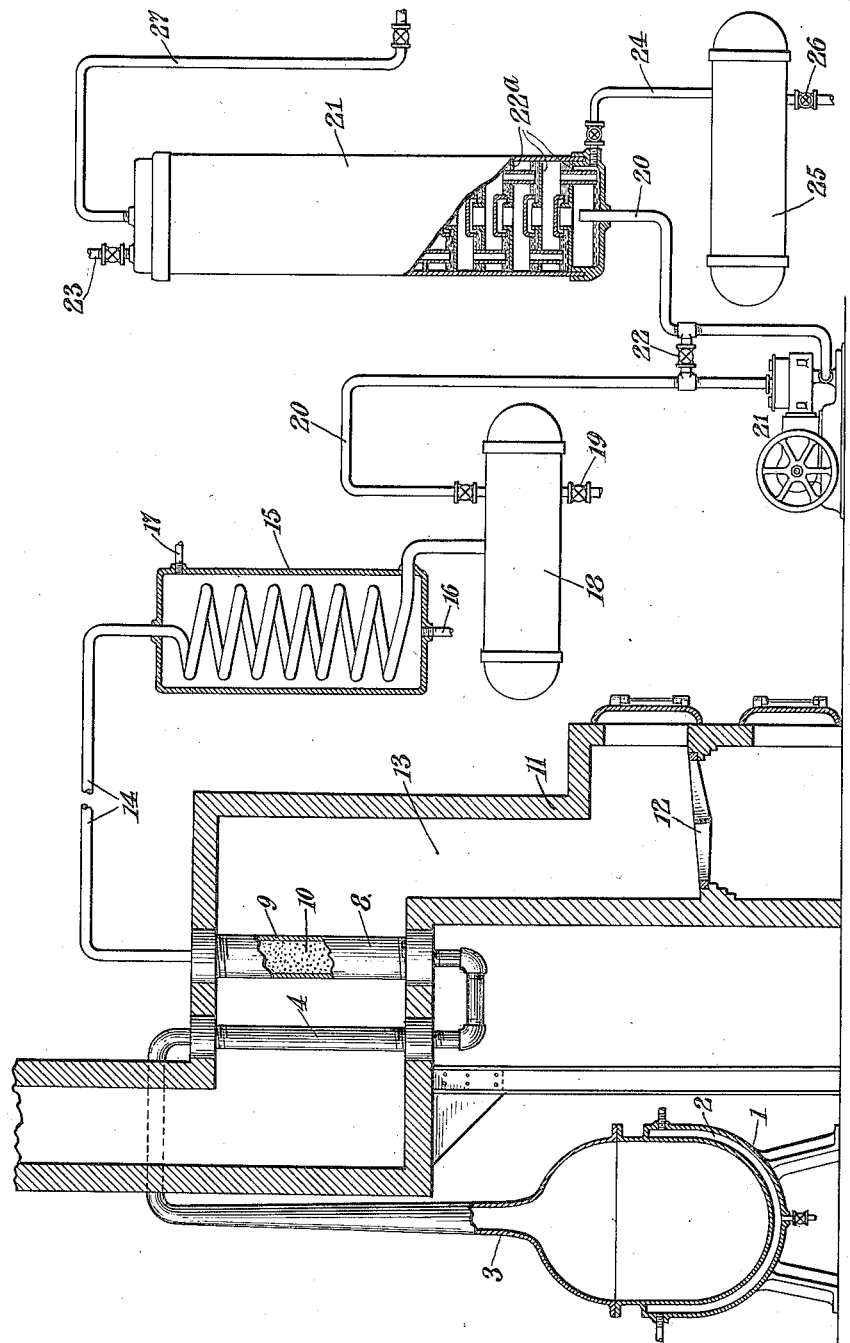

Patented Dec. 5, 1922.

1,437,483

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

APPARATUS FOR THE PRODUCTION OF ALDEHYDES.

Application filed December 19, 1918. Serial No. 267,484.

*To all whom it may concern:*

Be it known that I, ARTHUR A. BACKHAUS, of Baltimore, in the State of Maryland, have invented a certain new and useful Improvement in Apparatus for the Production of Aldehydes, and do hereby declare that the following is a full, clear, and exact description thereof.

My invention relates particularly to an apparatus for the production of aldehydes, and may, for example, be applied to the production of acetaldehyde or formaldehyde.

The object of my invention is to provide an apparatus by means of which aldehydes, such for example as acetaldehyde or formaldehyde, may be readily formed from their corresponding alcohols.

A further object is to provide an apparatus by means of which aldehydes may be formed through the action of a catalyst in a convenient and advantageous manner. Hitherto it was believed to be necessary, in carrying out the production of an aldehyde from its corresponding alcohol through the action of a catalyst, to maintain the temperature at a substantially fixed point, and that, therefore, it was necessary to apply a source of heat which would be capable of maintaining the temperature at that point. Furthermore, it was commonly believed to be necessary to utilize a copper vessel for the catalytic material, and some previous attempts to use iron vessels for this purpose resulted in failure to produce satisfactory quantities of the aldehyde. I have discovered not only that the aldehyde may be produced from its corresponding alcohol by the application of a wide range of temperatures, but that a source of direct heat, such for example as heat from a furnace, can be applied, notwithstanding the wide variation in temperatures obtained therefrom, and that, furthermore, iron containers may be used for the catalytic material while obtaining large yields of the aldehyde and without contamination or poisoning of the catalytic material thereby.

Further objects of my invention will appear from the detailed description thereof contained hereinafter.

While my invention is capable of embodiment in many different forms, for the purpose of illustration I have shown only one form of apparatus made in accordance with my invention in the accompanying drawings, in which—

The figure is a diagrammatic representation of an apparatus made in accordance with my invention.

In the drawing, I have shown a still 1 for supplying ethyl alcohol or methyl alcohol vapors, adapted to be heated by means of a steam jacket 2, and having a vapor outlet pipe 3, which passes through a preheater 4, adapted to be heated in any suitable way, as for example by utilizing therefor the heat of the waste flue gases from a furnace 5. The tube 3 is shown connected to a catalyzer 8 which may be comprised of an iron pipe 9, carrying a quantity of granular porous material 10, such for example as pumice stone unglazed porcelain, charcoal or terra cotta, carrying throughout the same particles of a finely divided catalyzer metal, such for example as copper, nickel, chromium or iron, which may be deposited therein by any suitable means, but preferably in such a manner as to involve the reduction of an oxide of the metal by a current of hydrogen, as for example as set forth in my application for process of making catalyzers Serial No. 240,221, filed June 15, 1918. Said catalyzer 8 is provided with any suitable direct heating means but may, for example, be heated from the furnace 5. Said furnace may have a grate 12 for fuel and a flue 13 through which the catalyzer tube 8 and the preheater 4 pass to be heated directly therefrom. A tube 14 may lead from the upper portion of the catalyzer 8 to a condenser 15, which may be provided with the usual inlet and outlet pipes for cooling water 16 and 17, and which is adapted to condense the ethyl alcohol or methyl alcohol, as the case may be, from the vapors which pass out of the catalyzer 8. The condensed alcohol may be caught in a cylindrical receiver 18 and may be drawn off by a valved pipe 19, while the uncondensed gases, comprising acetaldehyde or formaldehyde, together with hydrogen, may pass out by pipe 20, which may, if desired, contain a compressor 21. The compressor 21 may or may not be used, and if not used the gases may pass through a valved by-pass pipe 22 located in the pipe 20. From the pipe 20 the gases may pass into a scrubbing tower or column 21. The vapors in the tower 21 may pass through a series of liquid-sealed pans 22ᵃ, constructed in the same manner in which scrubbing towers or columns are ordinarily made, and in which pans a current of absorbing liquid may be caused to flow in the opposite direction from an inlet pipe 23 located at the top of the tower. The absorbing liquid may be water or ethyl alcohol or methyl alcohol. In case acetaldehyde is to be recovered, the liquid is preferably comprised of acetic acid, the most preferred form of which for this purpose is glacial acetic acid, in which the acetaldehyde is very soluble. In this way acetic acid containing 50% of acetaldehyde may be obtained. It is especially desirable to use acetic acid as the absorbing liquid for the acetaldehyde where the acetaldehyde is to be changed into acetic acid, as for example by the action of a current of air under a pressure of 50 to 75 pounds and an elevated temperature of 45° to 65° C. In case formaldehyde is to be obtained, the absorbing liquid is preferably water, by the use of which a solution containing 40% of formaldehyde may be obtained. The solution formed in the tower 21 may flow out of the same by means of an outlet pipe 24, and thence into a receiver 25, from which it may be drawn off by an outlet pipe 26. The hydrogen may pass out of the tower by means of a pipe 27 and may be collected in any suitable manner.

In the operation of my apparatus, a quantity of an alcohol, such for example as ethyl alcohol or methyl alcohol, is introduced into the still 1 and may be distilled therein by means of the heat applied from the steam jacket 2. The vapors of ethyl alcohol or methyl alcohol are then conveyed away by the pipe 3 to the preheater 4, where the vapors are heated to a temperature of between 250° to 350° C., but preferably approximately 300°, in the case of ethyl alcohol, and to a temperature of from 260° C. to 343° C., but preferably 316° C., in the case of methyl alcohol, the temperatures at which it desired to have the catalyst act upon the alcohols. These vapors, therefore, enter the catalyzer 8 at the required temperature, so that the formation of acetaldehyde or formaldehyde, as the case may be, immediately begins as soon as the vapors reach the finely divided metal carried upon the granular particles within the catalyzer tube 9. The furnace 11 provides the desired source of heat for heating the vapors while being acted upon by the catalyst, and the wide range of temperatures which are customarily incident to the application of direct heat, as from a furnace, does not interfere with the efficient production of the aldehydes, but on the contrary, the production thereof proceeds continually and substantially uniformly, irrespective of the minor variation in the temperatures applied. In this way, a large percentage of the vapors of ethyl alcohol or methyl alcohol are decomposed to form acetaldehyde or formaldehyde and hydrogen. The vapors passing out of the catalyzer by means of the tube 14 are in the use of the apparatus described conducted through the condenser 15, which is maintained at a temperature of 20° to 30° C., where any vapors of ethyl alcohol or methyl alcohol that are present are intended to be condensed and collected in the receiver 18, from which the condensate may be drawn off by means of the pipe 19. The acetaldehyde or formaldehyde and hydrogen pass out of the receiver 18 and may be conducted to the scrubbing tower or column 21, where the ascending vapors of acetaldehyde or formaldehyde and hydrogen are subjected to a counter-current of absorbing liquid of the character above described by passing through the series of liquid-sealed pans 22ᵃ therein until substantially all of the acetaldehyde or formaldehyde has become absorbed in the absorbing liquid to form a solution, which may pass out of the tower 21 by means of the pipe 24.

The hydrogen may pass out of the tower by means of the pipe 27 and may be collected in any suitable manner.

While I have described my invention above in detail, I wish it to be understood that many changes may be made therein without departing from the spirit of the same.

I claim:

In combination, a furnace having a vertical and a horizontal flue for hot gases, a short pipe constituting a catalytic chamber removably and vertically mounted in the horizontal flue, a preheater also vertically mounted in the horizontal flue adjacent said pipe but more remote from the furnace, a conduit connecting the bottom of the preheater and the catalytic chamber, and a vaporizer connected to the top of the preheater.

In testimony that I claim the foregoing I have hereunto set my hand.

ARTHUR A. BACKHAUS.

Witnesses:
 ERNEST J. WINTER,
 WILLIAM WATSON.